US007297219B1

(12) United States Patent
Menard et al.

(10) Patent No.: US 7,297,219 B1
(45) Date of Patent: Nov. 20, 2007

(54) DRUM ASSEMBLY FOR AN INTERNAL DRUM IMAGING DEVICE

(75) Inventors: Alan W. Menard, Bolton, CT (US); Kenneth R. Petersen, West Hartford, CT (US)

(73) Assignee: Gerber Systems Corporation, South Windsor, CT (US)

( * ) Notice: Subject to any disclaimer, the term of this patent is extended or adjusted under 35 U.S.C. 154(b) by 0 days.

(21) Appl. No.: 08/844,267

(22) Filed: Apr. 18, 1997

(51) Int. Cl.
*B29C 53/58* (2006.01)
(52) U.S. Cl. .................................... 156/173
(58) Field of Classification Search ........... 438/407.61, 438/490, 62; 156/171, 173, 131, 132, 133, 156/346, 401, 403, 415–417, 420, 182, 189, 156/190, 195; 420/221
See application file for complete search history.

(56) References Cited

U.S. PATENT DOCUMENTS 4,312,696 A * 1/1982 Bryant ........................ 156/415

4,977,473 A * 12/1990 Arai et al. .................. 360/130

* cited by examiner

*Primary Examiner*—Merrick Dixon
(74) *Attorney, Agent, or Firm*—McCormick, Paulding, Huber LLP

(57) ABSTRACT

A method for manufacturing a drum assembly for an internal drum-type imaging apparatus, and a drum assembly produced using the method. The drum assembly defines an imaging surface which is at least semi-cylindrical. A drum skin defines an imaging surface, and is releasably wrapped around a cylindrical mandrel, which has an axis. The mandrel and wrapped drum skin have a first radius. A drum includes more than one drum portion, and is attached to the drum skin over an at least semi-cylindrical interface. The drum has a radius slightly greater than the first radius, and the drum and attached drum skin cooperate to define a vacuum chamber. A fluid bearing is generated between the drum skin and the mandrel, preferably by pressurizing the vacuum chamber, in order to separate the drum skin from the mandrel. The drum and attached drum skin are then moved relative to the mandrel and in a direction parallel to the axis to remove the drum assembly from the mandrel. The drum and drum skin provide an imaging surface that is greater than semi-cylindrical.

9 Claims, 8 Drawing Sheets

DRUM ASSEMBLY FOR AN INTERNAL DRUM IMAGING DEVICE

FIELD OF THE INVENTION

The present invention relates generally to internal drum-type imaging devices, and more particularly to a method for manufacturing a drum assembly for such devices, and a drum assembly made using the method.

CROSS REFERENCES TO RELATED APPLICATIONS

Some of the matter contained in this application is disclosed in the commonly-owned U.S. patent application Ser. Nos. 08/844,250, entitled "Multiple Beam Scanning System For An Imaging Device", and Ser. No. 08/844,668 entitled "Media Feed Apparatus for An Imaging Device", both filed on even date herewith. Each of the foregoing patent applications are expressly incorporated by reference herein.

BACKGROUND OF THE INVENTION

Imaging devices including internal drum design, such as photoplotters and scanners, are known in the art. Photoplotters are used, for example, in the fields of printing plate production, graphic arts and the fabrication of printed circuit boards. Photoplotters expose a photo-sensitive media plate disposed on a drum imaging surface by sweeping a modulated optical beam over the media plate. The modulated optical beam is provided by a beam generator. Scanners function by illuminating a sample copy mounted on the drum with an unmodulated optical beam. The light which is reflected or transmitted from the copy is received by a detector and recorded.

Internal drum devices have a cylindrical drum surface portion to receive the media. A drum assembly of the device supports and defines the drum surface, as well as a vacuum chamber. The drum surface includes a number of apertures for rigidly but releasably receiving an imaging plate. When an imaging plate is positioned on the drum surface and a vacuum is applied, the plate is retained for imaging.

An optical beam generator emits a modulated optical feed beam onto a spinning mirror of a scanning assembly, and the mirror reflects the beam onto the media. As the mirror spins, the imaging beam reflected by the mirror advances across the plate from one side edge of the surface the other side edge thereof. The beam exposes a sequence of pixels, which form a scan line generally perpendicular to the axis of the drum. The mirror is mounted on a carriage which moves along the axis of the drum, generally perpendicular to the scan line. Since the carriage moves continuously, the imaging process generates slightly helical lines along the imaging plate. The rotating beam images the plate in this manner until the entire plate is imaged.

Known imaging apparatus utilize internal drum imaging surfaces that are semi-cylindrical or less than semi-cylindrical, i.e., the imaging beam only records on the media plate during one half or less for each rotation of the mirror. These known drum assemblies, including the drum casting and the drum skin, are relatively easy to manufacture.

Known drum assemblies are typically fabricated, for example by casting the drums as a single part, and provide a wide opening, i.e., at least a semi-cylindrical opening, for receiving a drum skin. A portion of the drum includes a series of lands for supporting the drum skin. Channels are provided between the lands, and define a portion of the vacuum chamber. An associated drum skin, fabricated from aluminum for example, is then positioned on the lands. Prior to positioning the drum skin, an adhesive is applied to the lands or other mounting points, and the drum skin is then attached.

It would be advantageous to provide in internal drum imaging device with a drum surface that permits imaging over more than 180° of each mirror revolution, i.e., the beam records on the media for more than one-half of each revolution. Such a drum surface would therefore be more than semi-cylindrical but less than completely cylindrical. In contrast to known drums which define an imaging surface that is less than semi-cylindrical, and therefore the opening is greater than semi-cylindrical, the proposed drums would include imaging areas that are greater than semi-cylindrical, and therefore define axial openings which are significantly less than semi-cylindrical.

The new drums provide significant advantages over previous drums, as set forth in co-pending application entitled "Media Feed Apparatus for An Imaging Device", filed on Apr. 18, 1997 as Ser. No. 08/844,668, by the assignee of the present invention, and which is expressly incorporated by reference herein. As an example, for a given drum radius, the maximum imaging width (W) is equal to the radius (R) multiplied by the overall imaging angle (w), thus $W=R*w$. The new drums provide an increased imaging angle (w), and are thus capable of generating a wider scan and thereby imaging a wider media. In the alternative, for a media of the same width, such drums can be made with a smaller radius, which enables an overall reduction in size for the corresponding imaging apparatus.

Conventional drums are typically fabricated by directly placing a drum skin onto a drum, and attaching the drum skin to the drum. In some cases, the drum skin is mounted onto a mandrel, by clamping the drum skin edges between a strip and the mandrel. The mounted drum skin and mandrel are positioned on the drum, and the skin is attached to the drum using an adhesive, or any other conventional means for attachment. The skin is released from the mandrel, and the mandrel is then simply moved radially out from the drum and drum skin assembly.

In view of the narrow opening provided in newer drums, conventional assembly methods cannot be used manufacture the drum assembly. Since the newer drums are greater than semi-cylindrical, it is not possible merely to lift the mandrel from the drum and drum skin assembly.

Accordingly, it is an object of the present invention to provide a method of manufacturing a drum assembly for internal drum imaging devices, and a drum assembly made in accordance with the method.

It is another object to provide such a method and a drum assembly where the drum surface enables imaging over more than 180° of each scan rotation, i.e., the drum is more than semi-cylindrical.

The above and other objects and advantages of this invention will become readily apparent based upon the following description and accompanying drawings.

SUMMARY OF THE INVENTION

According to one aspect of the present invention, a method is disclosed for manufacturing a drum assembly for an internal drum-type imaging apparatus. The drum assembly provides an imaging surface which is at least semi-cylindrical, and preferably is significantly greater than semi-cylindrical.

The method includes the steps of: releasably wrapping a drum skin around a cylindrical mandrel which has an axis, the mandrel and wrapped drum skin have a first radius and the drum skin defines an imaging surface; attaching a drum to the drum skin while the drum skin is wrapped around the mandrel, the drum having a radius slightly greater than the first radius, the drum and drum skin define an at least semi-cylindrical interface and define a vacuum chamber; generating a fluid bearing between the drum skin and the mandrel to separate the drum skin from the mandrel; and moving the drum and attached drum skin relative to the mandrel and in a direction parallel to the axis to remove the drum assembly from the mandrel while maintaining the fluid bearing between the drum skin and the mandrel, whereby the drum and drum skin define an imaging surface that is greater than semi-cylindrical.

According to another aspect of the present invention, a drum assembly is disclosed for use in an internal drum-type imaging apparatus. The drum assembly is manufactured according to the above method.

The method of the present invention, and the drum assembly manufactured according to the method, provide an imaging surface that is greater than semi-cylindrical. In contrast to known drum assemblies for which the imaging surface is less than or equal to semi-cylindrical, the newer drums provide significant advantages.

As an example, for a given drum radius, the newer drums are capable of imaging a wider media, since the beam records over more than one half of each rotation, thereby generating a wider scan. Alternatively, imaging media of the same width can be accommodated by newer drums having a smaller radius, which enables an overall reduction in size for the corresponding imaging apparatus. The smaller radius also reduces the distance traveled by the imaging beam between the mirror and the imaging plate, and the corresponding potential distortion of the beam associated with prior drums. Moreover, the newer drums simply cannot be manufactured using known assembly processes.

DETAILED DESCRIPTION OF THE PREFERRED EMBODIMENTS

Figure 1:
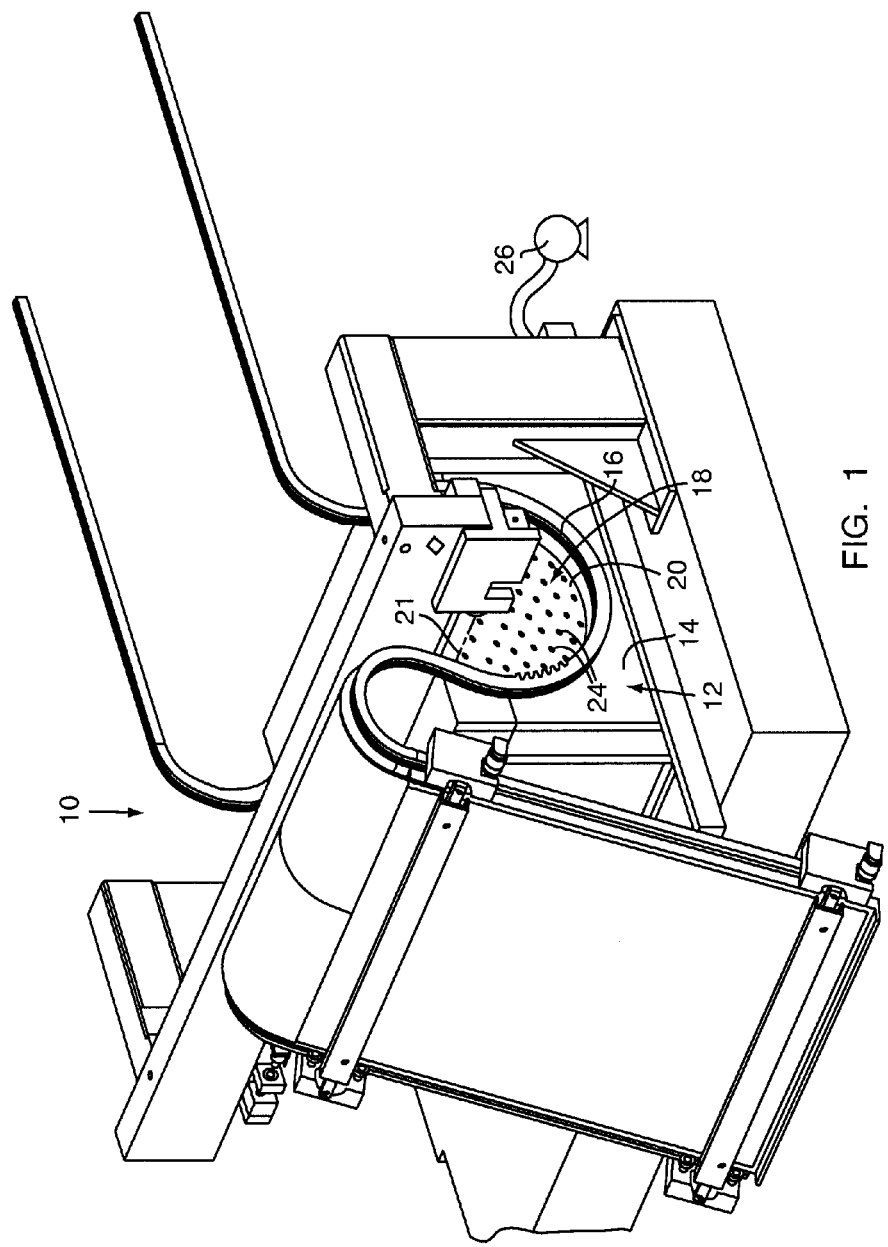
FIG. 1 is a schematic, perspective view of a drum type imaging apparatus which incorporates a drum assembly of the present invention.

FIG. 1 illustrates an imaging device generally designated 10, incorporating a drum assembly of the present invention, and adapted for reflecting or turning an optical beam between an imaging surface and an optical beam processor 21. The beam processor may be an optical beam generator for a photoplotter or an optical beam generator for a scanner. Such internal drum imaging device is shown and described in more detail in U.S. Pat. No. 5,291,392 issued to Gerber et al. on Mar. 1, 1994 entitled "Method and Apparatus For Enhancing the Accuracy of Scanner Systems", and also in co-pending application filed on Apr. 18, 1997 as Ser. No. 08/844,668, entitled "Media Feed Apparatus for An Imaging Device", both of which are assigned to the assignee of the present invention and are expressly incorporated herein by reference.

Photoplotters expose a photosensitive media plate disposed on an imaging surface by sweeping a modulated optical beam from a beam generator over the media plate. Scanners function by illuminating the test sample with an unmodulated optical beam and capturing the reflected light by the beam receivers. While the following description of the imaging apparatus shown in the Figures relates to a photoplotting apparatus, one skilled in the art would recognize that the present invention is equally applicable to a scanning apparatus.

The photoplotter 10 has a drum assembly 12, which includes a drum 14 and a drum skin 16 defining a generally cylindrical-shaped exposure chamber 18. As illustrated in FIG. 1 and described further below, the drum assembly defines an imaging surface 20 which is greater than semi-cylindrical, to enable an imaging beam to record on a print media for greater than one half of each revolution of the plotting optics. The imaging surface 20 provides an internal support structure for supporting a media sheet or plate (not shown in FIG. 1) in a given orientation to a point along the central or z-axis 22 of the internal drum. Those skilled in the art will recognize that the z-axis 22 of the internal drum is preferably coaxial with a longitudinal axis of the support surface defined by the drum assembly 12.

The drum skin 16 is fabricated from a resilient but fairly rigid material, such as aluminum. The side of the drum skin which supports the media sheets is preferably coated to prevent damage to the skin during manufacture of the drum assembly a during use, for example with a 0.002 inch layer of a hard coat polytetrafluoroethylene (PTFE) marketed under the name "POLYLUBE". The media sheets may be a sheet of aluminum or polymer, such as polyester, having a photosensitive emulsion coated on one surface thereof or a sheet of photosensitive film. A plurality of apertures 24 are defined by the support surface 16 of the drum assembly 12 are provided for the purpose of drawing the plate or sheet down onto the support surface under vacuum pressure applied by a vacuum generator 26 and associated manifold system (not shown) disposed below the drum in the lower portion of the structure.

The photoplotter 10 further includes one or more known optical beam generators and beam forming optics. One or more optical beams are received and reflected to the media by a corresponding scanning assembly, which includes a spinning mirror for scanning a light beam across the imaging plate and along a plotting axis 29 which is parallel, and preferably coaxial with the drum axis, as is generally known in the art.

Figure 2:
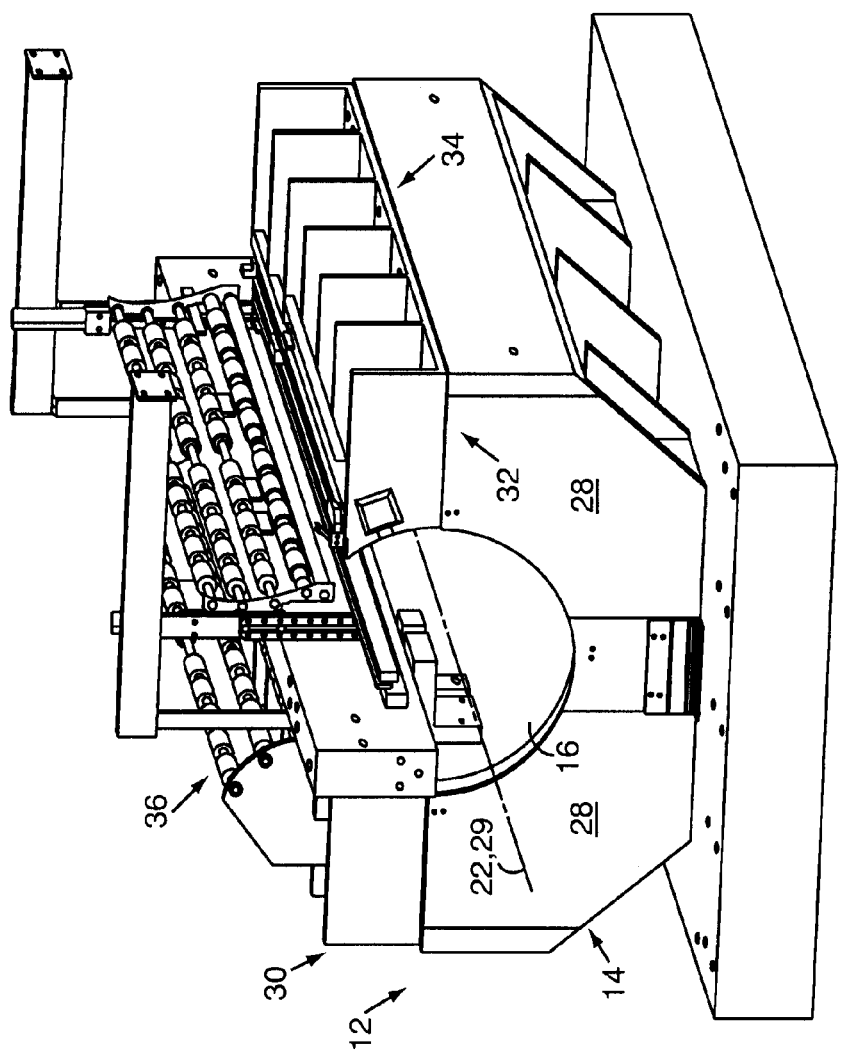
FIG. 2 is a perspective view of a portion of the imaging apparatus of FIG. 1, illustrating the drum assembly in more detail.

FIG. 2 illustrates the drum assembly 12 of the imaging apparatus 10 in more detail. The drum assembly 12 includes a unitary main portion 28 and four upper portions 30, 32, 34 and 36 (FIG. 4), which cooperate to define a drum axis 29 (see also FIGS. 3 and 5). As is discussed further below, the upper portions are properly positioned on the base portion using locating pins and recesses, and are preferably also adhesively attached to the main drum portion 28. The main portion defines a drum skin receiving surface that is preferably about semi-cylindrical or 180°, and the upper portions 30, 32, 34, 36 define an additional drum skin receiving surface, for example an additional 80° or so. Thus, with the drum portions attached to the drum skin 16, the media support surface 20 defined by the drum skin 16 provides an imaging surface which covers a total angle 38 (FIG. 5) of about 260° of each revolution of an imaging beam. The total angle 38 may be larger or smaller, and is essentially limited only by the support structure for the imaging optics of the completed imaging apparatus and the need to mount and unmount plates in the exposure chamber, as shown in FIG. 1.

The use of separate drum portions, as shown in FIG. 2, enables easier casting of the overall drum, and particularly of the upper portions. The drum may also include a different number of portions, so long as the drum includes at least two portions are employed and none of the portions alone is greater than semi-cylindrical. For example, where two portions are utilized, the portions include similar left and right portions. In the illustrated embodiment, the portions of the drum define a series of lands and channels (not shown), as is known in the art. The lands provide an attachment surface and support for the drum skin 16. The channels provide the vacuum chamber for retaining an imaging plate, as described above.

The drum portions are fabricated from cast aluminum, such as 356 T 71 or -T 51 aluminum, or other suitable material. Since imaging operations generate a significant amount of heat, the drum skin 16 and material used to attached the skin to the drum are preferably fabricated from an identical or similar material. The portion of the drum skin 16 which supports imaging plates may also be coated with a protective layer of material such as "Teflon".

Figure 3:
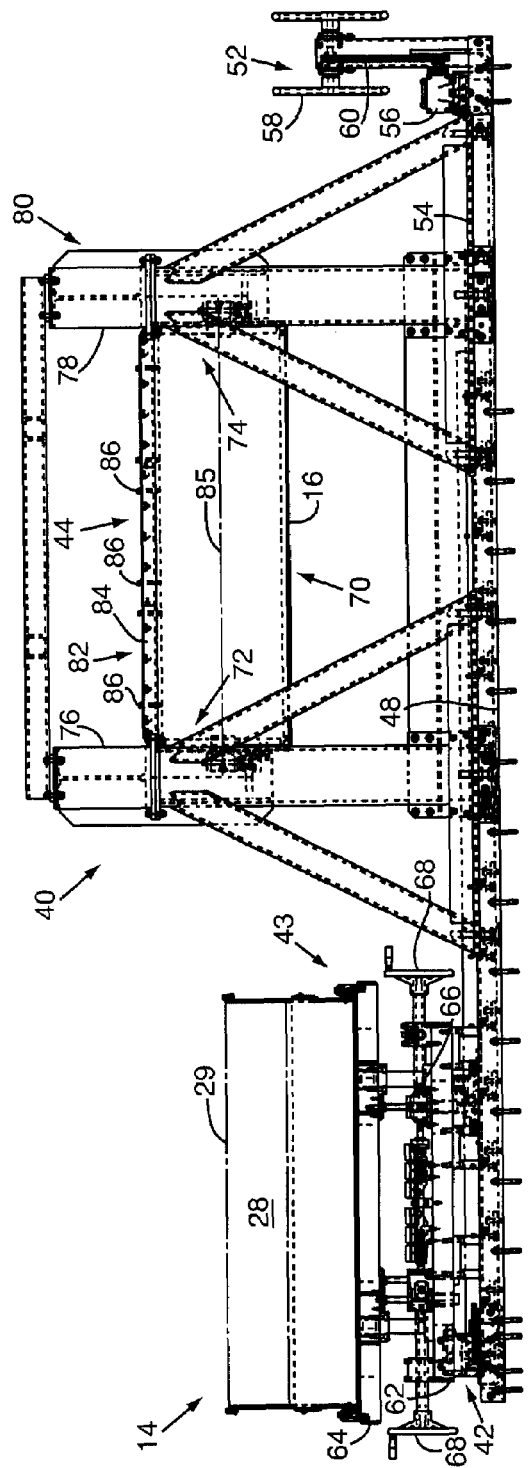
FIG. 3 is a side elevational view of an apparatus for manufacturing the drum assembly in accordance with the method of the present invention, and illustrating a platform supporting a portion of the drum and a bonding mandrel for supporting a drum skin of the assembly.
Figure 4:
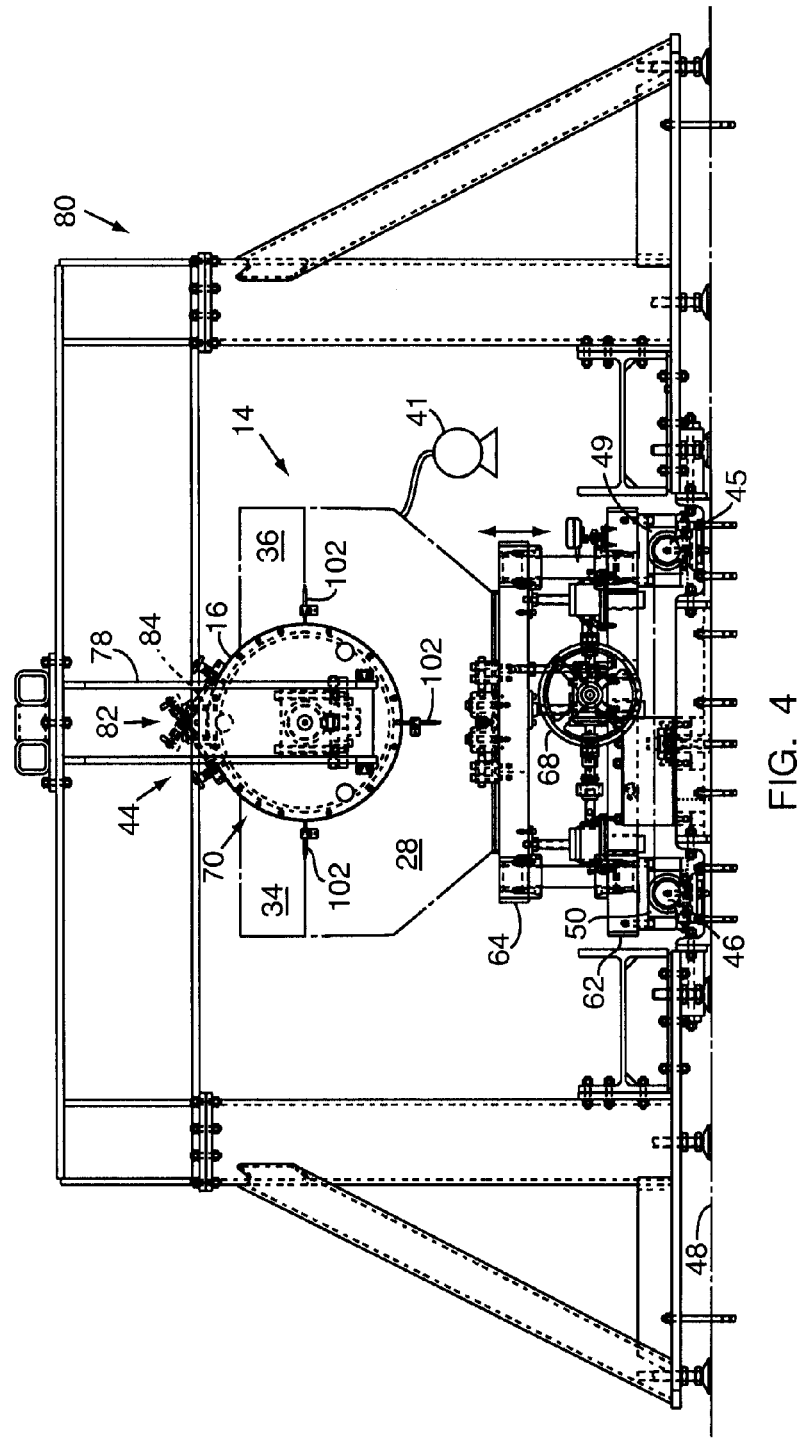
FIG. 4 is a right end, elevational view of the apparatus of FIG. 3.

Turning now to FIGS. 3 and 4, an apparatus for manufacturing the drum assembly in accordance with the present invention is indicated generally by the reference numeral 40, and provides precise movement of the drum skin 16 relative to the drum 14 (shown in phantom). A pressurized air source 41 is also provided for removing the drum skin, and thus the finished drum assembly, from the mandrel assembly, as is described further below. The apparatus 40 includes a linear track 42, a platform 43 mounted for sliding movement along the track, and a bonding mandrel assembly 44 mounted at one end of the track.

The track 42 includes a pair of parallel races 45, 46 (FIG. 5), each of which is rigidly mounted to a generally planar, level surface 48, such as a reinforced concrete floor. As discussed below, since the drum skin 16 is mounted precisely on the mandrel assembly 44 and must be precisely aligned with a drum positioned on the platform 43, it is critical to enable precise, consistent relative movement of the platform and the mandrel assembly.

In the illustrated embodiment, the races 45, 46 are each of substantial dimension, e.g., about 3 inches in diameter and about 15 feet in length, and are manufactured by Thomson, Inc. While the illustrated races have a round cross section, other cross sections and races may also be employed with equal effect.

The platform 43 is supported on the races 45, 46 by a set of linear bearing 49, 50, which complement the cross section of the races. The bearings 49, 50 enable precise sliding movement of the platform along the races. Movement of the platform 43 along the races 45, 46 is provided by a manually actuated drive 52. The drive 52 includes an endless chain 54, which extends along the length of the races 45, 46 and is coupled through a right angle drive 56 to a travel wheel 58 and chain 60. The drive 52 also includes an associated clamp (not shown) for releasably locking the bearings 49, 50 in position on the races 45, 46, thus fixing the axial positions of the platform 43 and associated drum 12 relative to the mandrel assembly 44 and associated drum skin 16.

Figure 5:
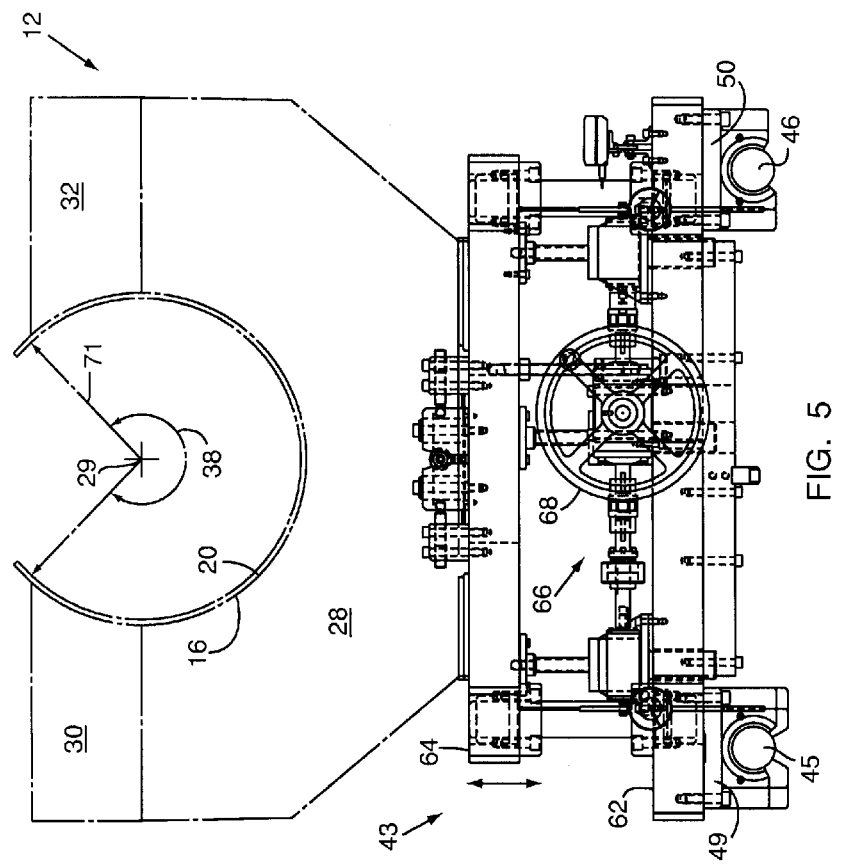
FIG. 5 is a left end, elevational view of the platform and a completed drum assembly.

The platform 43 is also movable vertically relative to the races 45, 46, and thus to the mandrel assembly 44. As shown in FIGS. 3 and 5, the bearings 49, 50 carry a base 62 of the platform 43. A drum support member 64 is in turn mounted for precise vertical movement relative to the platform base 62. The precise vertical movement is provided by a screw jack assembly 66, which is driven by a hand wheel 68. Those skilled in the art will recognize that various other mechanisms, including non-manual mechanisms, may be employed with equal effect.

Returning to FIGS. 3 and 4, the mandrel assembly 44 includes a bonding mandrel 70, which has a cylindrical shape and a radius equal to the interior radius 71 (FIG. 5) of the finished drum assembly. The mandrel 70 is preferably although not necessarily fabricated from steel, and is rigidly supported at opposite ends 72, 74 by vertical support members 76, 78. The vertical support members 76, 78, in turn, are supported by a mandrel support frame, indicated generally at 80. As noted above, it is critical to enable precise relative movement of the mandrel 70 and platform 43 one hand, and the drum skin 16 and the drum 14 on the other hand. Thus, the vertical support members 76, 78 and mandrel support frame 80 are of a rigid, substantial construction.

Figure 6:
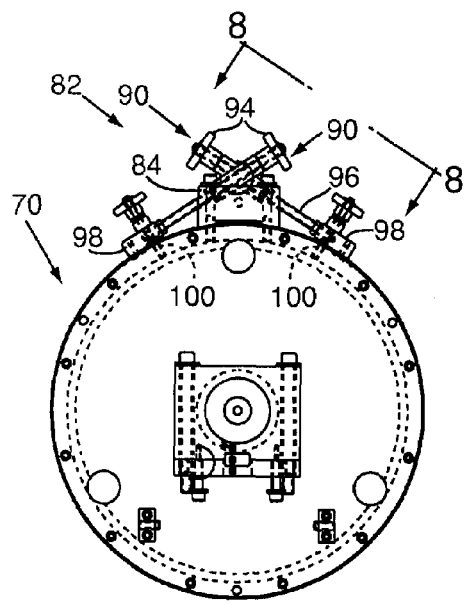
FIG. 6 is an end view of the mandrel similar to FIG. 4, but illustrating only the drum skin mounted to the mandrel by a clamping assembly.
Figure 9:
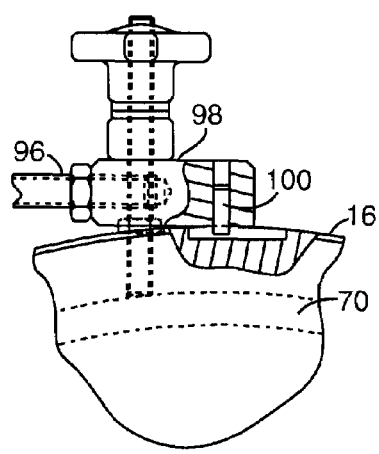
FIG. 9 is a fragmentary view, similar to FIGS. 6 and 9, but illustrating the cooperation between a clamp of the clamping assembly, the drum skin and the mandrel.
Figure 10:
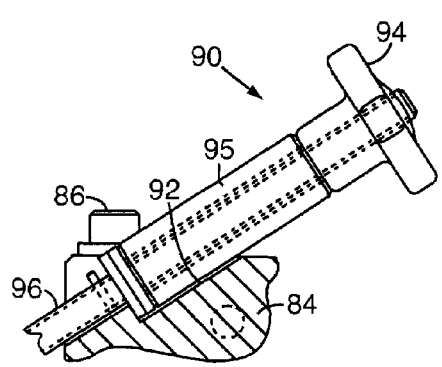
FIG. 10 is a fragmentary view, similar to FIG. 9, but illustrating the cooperation between a clamp and a clamping strip of the clamping assembly.

As shown in FIGS. 3, 4 and 6, the drum skin 16 is attached to the bonding mandrel 70 by a clamping assembly 82. The assembly 82 includes a clamping strip 84, which extends parallel to the mandrel axis 85 and along the top of the mandrel 70. The clamping strip 84 is mounted to the mandrel by pins 86. With reference to FIGS. 5 and 6, the drum skin 16 is slightly wider than the circumference of the drum support surface 20, so that the edges of the drum skin 16 extend beyond the assembled drum castings 28, 30, 32, 34, 36. Corresponding holes 88 are provided along the edges of the drum skin 16, and the clamping assembly 82 engages the holes to clamp the drum skin to the mandrel 70.

Turning to FIGS. 6, 8, 9 and 10, the clamping assembly 82 also includes several clamps 90, which are seated in recesses 92 positioned along the clamping strip 84. Each clamp 90 includes a hand knob 94, a sleeve 95 which is seated in the recess 92, a threaded body 96 which passes thorough the sleeve and is coupled to a block 98. Each block 98 includes two pins 100, 100, and is mounted for pivotal movement relative to the threaded stud 96. The pins 100 cooperate with the corresponding holes 88 provided along the outer edges of the drum skin 16. Each of the blocks 98 is coupled to adjacent blocks by couplings 99.

In accordance with the method of the present invention, the drum assembly 12 is manufactured as follows. The mandrel 70 is cleaned to remove loose particles, and then sprayed with an anti-adherent material, i.e., a mold release, to facilitate subsequent removal of the drum skin at the end of the assembly process. As best illustrated in FIGS. 3, 4 and 6, the drum skin 16 is manually wrapped around the mandrel. The clamping strip 84 is positioned on top of the mandrel 70 using the pins 86. The pins of clamps 90 are then installed in the holes 88 along the edge of the drum skin 16 which is wrapped on the mandrel. The clamp heads 94 are then turned as needed to tighten and retain the drum skin on the mandrel 70. Preferably, the clamps 90 hold the drum skin 16 on the mandrel with a force that is uniformly distributed along the drum skin. To that end, the blocks 98 may pivot relative to their respective threaded bodies 96, to evenly distribute the force. The individual clamps 90 of the clamping assembly 82 are then tightened as needed to secure the drum skin to the mandrel.

Conventional sensors are mounted to the mandrel and/or drum skin for later use to ensure proper alignment of the drum and drum skin. Such sensors include remote transducers sold by Federal Gage Co. as model EAS-2883. Proper care must be taken to ensure that the skin is properly aligned on the mandrel, e.g., with the drum skin edges oriented generally parallel to the drum axis 85, to enable subsequent proper positioning of the skin on the drum.

Figure 7:
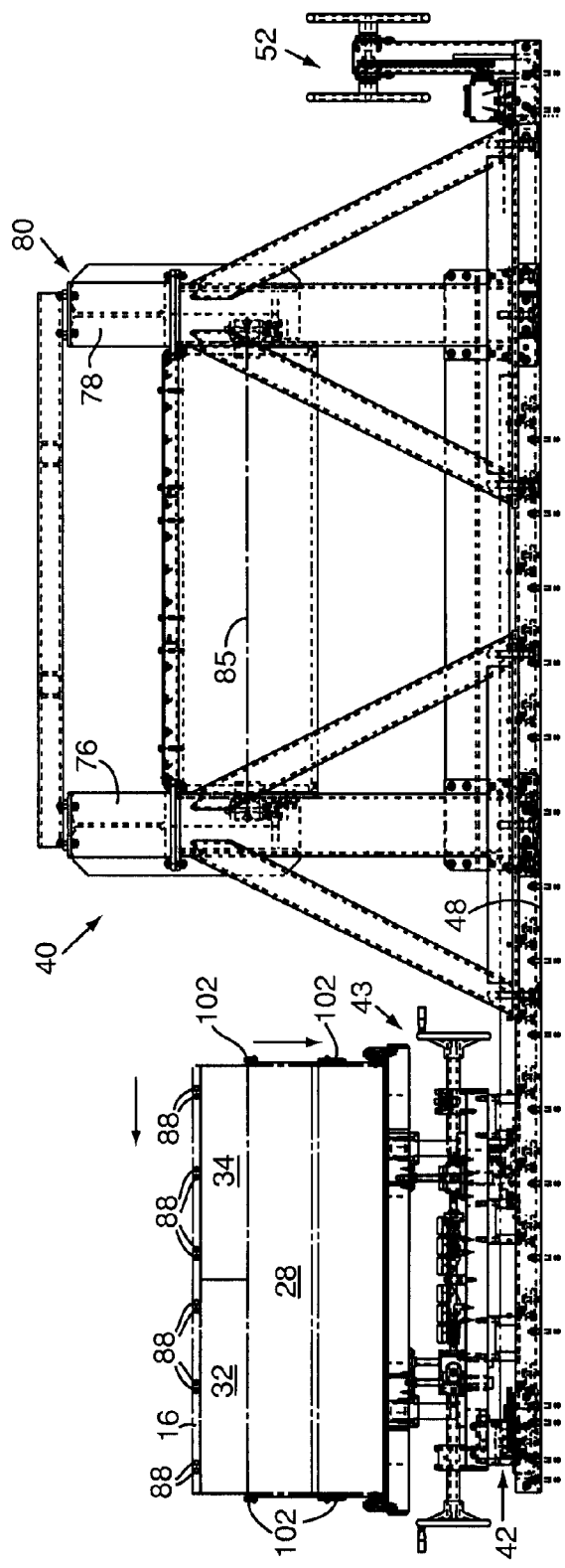
FIG. 7 is a view similar to FIG. 3, but illustrating the apparatus after completion of the drum assembly.
Figure 8:
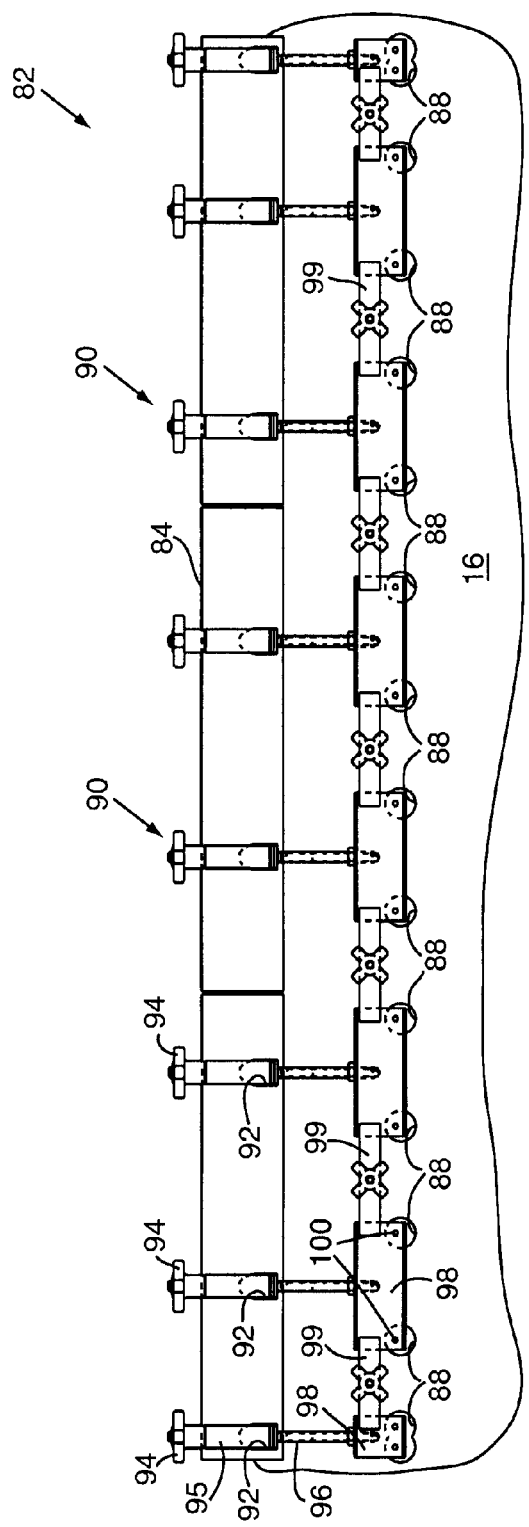
FIG. 8 is a fragmentary view taken along the line 8-8 of FIG. 6, but illustrating only one side of the clamping assembly of FIGS. 3, 4 and 6.

The main portion of the drum casting 28 is positioned on the drum support member 64 of the platform 43. Conventional sensors are mounted to the drum support member 64 or other portion of the platform 43 and to the main portion 28 of the drum, again for use in properly positioning the main portion relative to the drum skin 16 wrapped on the mandrel 70. With reference to FIGS. 4 and 7, such sensors 102 include indicating units sold by Federal Gage Co. as model DEI-73110. The drum 28 is adjusted or shimmed as needed to ensure that the drum axis 29 is parallel to the races 45, 46, and thus to the mandrel axis 85.

The main portion of the drum 28 and wrapped drum skin 16 are then "dry fit", together with the upper portions 30, 32, 34, 36, to ensure proper positioning and fit prior to assembly. With reference first to FIG. 3, the platform 43 is lowered as needed so that the drum axis 29 is positioned lower than the mandrel axis 85, and the platform 43 is then moved from the position shown in FIG. 3 to a position immediately below the mandrel 70 and drum skin 16. Next, the platform 43 is raised towards the mandrel and drum skin. Again, care is taken to ensure that the main portion of the drum 28 is aligned with the mandrel 70 and wrapped drum skin 16.

The platform is raised until the main portion of the drum 28 contacts the drum skin 16. As illustrated in FIG. 5, the upper portions 30, 32, 34, 36 are then mounted on the main portion and against the drum skin, and checked to ensure proper fit and alignment. Once assembled, clearances between the drum portions are checked, and are preferably uniform and on the order of about five-one thousandths of an inch (0.005"). The clearance between the drum portions 28, 30, 32, 34, 36 the drum skin 16, and will be filled with a material used to join these parts. The upper portions 30, 32, 34, 36 are then carefully removed, and the main portion 28 is lowered from its position against the drum skin 16. Then, the platform is moved from its position below the mandrel 70 and drum skin 16, as illustrated in FIG. 3.

Immediately prior to final assembly, the exposed (attaching) surface of the drum skin 16 is cleaned with an appropriate cleaning agent, e.g., in the illustrated case the aluminum drum skin and drum portions are cleaned with an aluminum prep solution.

The lands defined on the main drum portion 28 are then covered with an epoxy adhesive. Since significant heat is generated during use of the finished imaging apparatus, the epoxy has properties, particularly thermal expansion properties, similar to that of the drum material and drum skin. Once the epoxy adhesive is applied to the lands of the main portion 28, the platform 43 is again moved along the races 45, 46 to a position below the drum skin 16 mounted on the mandrel 70. The platform 43 is carefully raised towards the drum skin 16, again to ensure the proper joining of the main portion 28 and the drum skin 16. Once the platform 43 is raised so that the epoxy covered lands of the main drum portion 28 abut the drum skin, and assuming that the drum axis 29 is coaxial with the mandrel axis 85, the upper portions 30, 32, 34, 36 of the drum are attached. The drum portions 28, 30, 32, 34, 36 cover a portion of the drum skin 16 that is at least semi-cylindrical, or greater if desired. The epoxy adhesive is next applied to the lands of each upper portion, and each upper portion is mounted on the main drum portion 28 to abut the drum skin 16. The epoxy is then allowed to cure as needed.

After the epoxy has cured, and prior to removal of the drum assembly from the mandrel 70, the clamping assembly 82 is removed. The drum assembly 12 is connected to the pressurized air source 41 (FIG. 4). The air source pressurizes the vacuum chamber defined by the drum assembly, and generates an air bearing, and thus a clearance, between the drum skin 16 and the mandrel 70. The platform 43 and drum assembly are then moved parallel to the mandrel axis 85 and away from the mandrel 70, while maintaining the coaxial relationship of the drum axis 29 and the mandrel axis 85, until the finished drum assembly is completely removed from the mandrel. The drum skin 16 which extends beyond the drum portions, as shown in FIG. 5, is trimmed as needed, and the drum assembly is subsequently incorporated into a completed imaging apparatus 10 (FIG. 1).

The method of the present invention, and the drum assembly manufactured according to the method, provide an imaging surface that is greater than semi-cylindrical. In contrast to known drum assemblies for which the imaging surface is less than or equal to semi-cylindrical, the newer drums provide significant advantages.

As an example, for a given drum radius, the new drums provided by the present invention are capable of imaging a wider media, since the beam records over more than one half of each rotation, thereby generating a wider scan. Alternatively, imaging media of the same width can be accommodated by new drums having a smaller radius, which enables an overall reduction in size for the corresponding imaging apparatus. The smaller radius also reduces the distance spanned by the imaging beam between the mirror and the imaging plate, and the corresponding potential distortion of the beam associated with prior drums. Moreover, the new drums described above simply cannot be manufactured using known assembly processes.

While preferred embodiments have been shown and described, various modifications and substitutions may be made without departing from the spirit and scope of the invention. Accordingly, it is to be understood that the present invention has been described by way of example and not by limitation.

What is claimed is:

1. A drum assembly for an internal drum-type imaging apparatus, the drum assembly defining a concave imaging surface which is more than semi-cylindrical, the assembly made in accordance with a method comprising the steps of:
    releasably wrapping a drum skin partially around a generally cylindrical mandrel having an axis, the drum skin having a front face facing toward said mandrel and defining an imaging surface and also having a rear face facing away from said mandrel;

fixedly attaching a drum to said rear face of the drum skin while the drum skin is wrapped around the mandrel, the drum and drum skin each extending for more than 180° and less than 360° about the mandrel axis so as to define an interface of greater than 180° and less than 360° extent about the mandrel axis and which drum and drum skin cooperate to define a vacuum chamber;

generating a fluid bearing between said front face of the drum skin and the mandrel to separate the drum skin from the mandrel; and moving the drum and attached drum skin relative to the mandrel and in a direction parallel to the mandrel axis to remove the drum and attached drum skin from the mandrel while maintaining the fluid bearing between the drum skin and the mandrel, whereby the drum and attached drum skin after removal from said mandrel provide said drum assembly with said front face of said drum skin defining said concave imaging surface which is more than semi-cylindrical.

2. The assembly of claim 1, wherein the method further comprises the step of:

applying an anti-adherent material to the mandrel prior to the step of releasably wrapping the drum skin to the mandrel.

3. The assembly of claim 1, wherein the step of attaching the drum includes adhesively attaching the drum to the drum skin.

4. The assembly of claim 1, wherein the drum comprises more than one drum portion, and the step of attaching the drum includes attaching the drum portions one at a time to the drum skin.

5. The assembly of claim 1 wherein the drum skin has a plurality of apertures, and the step of generating a fluid bearing includes the step of providing fluid to the vacuum chamber at a pressure greater than atmospheric pressure.

6. The assembly of claim 1, wherein the step of releasably wrapping a drum skin includes releasably clamping the drum skin to the mandrel.

7. The assembly of claim 1, the mandrel and wrapped drum skin having a first radius, and the step of attaching the drum includes attaching a drum having a radius slightly greater than the first radius.

8. The assembly of claim 7, wherein the drum radius is about 20 mils greater than the first radius.

9. The assembly of claim 1, wherein the drum is made of a plurality of portions each of which portions is of no more than 180° extent about said mandrel axis, and which portions are individually placed onto the rear face of the drum skin after the wrapping of the drum skin onto the mandrel, and which portions are then attached to the drum skin and to one another.

* * * * *